United States Patent Office 3,483,218
Patented Dec. 9, 1969

3,483,218
4-{N - ALKYL - N-[β-(β'-PHTHALIMIDO ETHOXY) ETHYL]AMINO}-ω,ω-DICYANOSTYRENES
Christopher David Marrable, Manchester, England, assignor to Imperial Chemical Industries Limited, London, England, a corporation of Great Britain
No Drawing. Continuation-in-part of application Ser. No. 577,797, Sept. 8, 1966. This application Aug. 13, 1968, Ser. No. 752,150
Claims priority, application Great Britain, Sept. 16, 1965, 39,585/65; Apr. 13, 1966, 16,178/66
Int. Cl. C07d 27/52
U.S. Cl. 260—326                                                             1 Claim

ABSTRACT OF THE DISCLOSURE

4 - {N - alkyl - N-[β-(β'-{phthalimido}ethoxy)ethyl]amino} - ω:ω - dicyanostyrenes, a process for their manufacture, and the use of the compounds for colouring synthetic textile materials.

---

This a continuation-in-part application of application Ser. No. 577,797 which was filed on Sept. 8, 1966, now U.S. Patent No. 3,435,062.

This invention relates to new dyestuffs and more particularly it relates to new water-insoluble styryl dyestuffs which are valuable for colouring synthetic textile materials.

According to the invention there are provided the water-insoluble styryl dyestuffs of the formula:

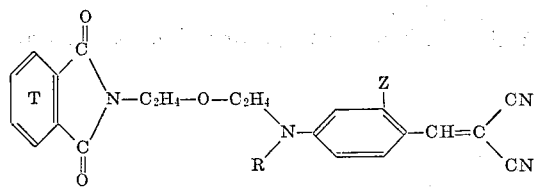

wherein R represents a lower alkyl radical, Z represents a hydrogen atom or a lower alkyl radical, and the benzene ring T can contain a substitutent selected from the class consisting of lower alkyl, lower alkoxy, chlorine, bromine and nitro.

Throughout this specification the terms "lower alkyl" and "lower alkoxy" are used to denote alkyl and alkoxy groups respectively containing from 1 to 4 carbon atoms. As examples of the said groups there may be mentioned methyl, ethyl, n-propyl and n-butyl, and methoxy, ethoxy, n-propoxy and n-butoxy groups respectively.

The water-insoluble styryl dyestuffs of the invention are obtainable by reacting malonodinitrile with an aldehyde of the formula:

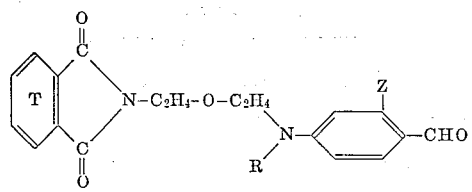

Formula I wherein T, R and Z have the meanings stated.

This reaction can be conveniently brought about by stirring the reactants together in an organic solvent, such as methanol, and in the presence of a basic compound, such as, ammonia or a secondary amine such as diethylamine or piperidine or an alkali metal derivative of an alcohol such as the sodium derivative of methanol or ethanol, the reaction being carried out at a temperature between 20° C. and the boiling point of the organic solvent.

The dyestuff so obtained is then isolated by conventional methods, for example by filtering off the precipitated dyestuff, or by removing the organic solvent by distillation, or by adding a liquid, such as water, which precipitates the dyestuff from the solution in the organic solvent.

The aldehydes of Formula I may themselves be obtained, for example, by reacting a compound of the formula:

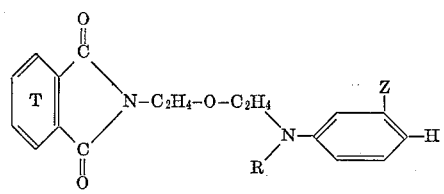

Formula II with phosphorus oxychloride in dimethylformamide. The compounds of Formula II can, for example, be obtained by reacting a compound of the formula:

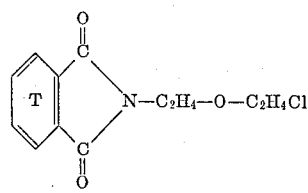

with a N-substituted aniline of the formula:

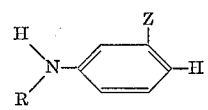

The styryl dyestuffs, as hereinbefore defined, are valuable for colouring synthetic textile materials, for example cellulose acetate textile materials such as secondary cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread, yarn, or woven or knitted fabric.

Such textile materials can conveniently be coloured with the dyestuffs, as hereinbefore defined by immersing the textile materials in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile material it is preferred to carry out the dyeing process at a temperature between 60° and 85° C.; in the case of cellulose triacetate or polyamide textile materials it is preferred to carry out the dyeing process at 95° to 100° C.; in the case of aromatic polyester textile materials the dyeing process can either be carried out at a temperature between 90° and 100° C., preferably in the presence of a carrier such as diphenyl or o-hydroxydiphenyl, or at a temperature above 100° C., preferably at a temperature between 120° and 140° C., under superatmospheric pressure.

Alternatively the aqueous dispersion of the said dyestuff can be applied to the textile material by a padding or printing process, followed by heating or steaming of the textile material. In such processes it is prefered to incorporate a thickening agent, such as gum tragacanth, gum arabic or sodium alginate, into the aqueous dispersion of said dyestuff.

At the conclusion of the colouring process it is preferred to give the coloured textile material a rinse in water or a brief soaping treatment before finally drying the coloured textile material. In the case of aromatic polyester textile material it is also preferred to subject the coloured textile material to a treatment in an alkaline aqueous solution of sodium hydrosulphite before the soaping treatment in order to remove loosely attached dyestuff from the surface of the textile material.

The styryl dyestuffs of the invention have excellent affinity and build-up properties on synthetic textile materials, and in particular on aromatic polyester textile materials, so enabling deep shades to be obtained. The resulting colorations, which range in shade from greenish-yellow to orange, have excellent fastness to light, to wet treatment, and, in particular, to dry heat treatments such as those carried out at high temperatures during pleating operations.

The invention is illustrated by the following examples in which the parts are by weight.

Example 1

A mixture of 3.8 parts of 2-methyl-4-(N-ethyl-N-[β-(β'-{phthalimido}ethoxy)ethyl]amino)benzaldehyde, 0.7 part of malonodinitrile, 0.01 part of piperidine and 10 parts of ethanol is stirred for 2 hours at the boil under a reflux condenser. The resulting solution is cooled to 10° C., and the dyestuff of the formula:

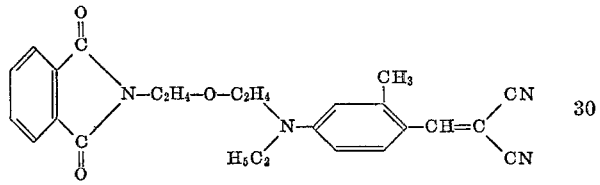

which separates out is filtered off and dried.

When dispersed in aqueous medium the dyestuff so obtained dyes polyester and cellulose triacetate textile materials in bright yellow shades possessing excellent fastness to light and to wet treatments.

The aldehyde used in this example was itself obtained by condensing N-ethyl-N-[β-(β'-chloroethoxy)ethyl]-m-toluidine with potassium phthalimide, and reacting the resulting compound with phosphorous oxychloride in dimethylformamide.

The following table gives further examples of the water-insoluble styryl dyestuffs of the invention having the formula:

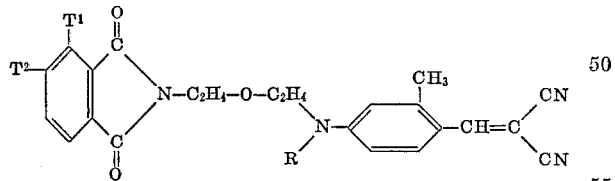

the symbols of which have the values given in the respective columns of the table. All these dyestuffs gave bright yellow shades of excellent fastness properties when applied to aromatic polyester textile materials from an aqueous dyebath.

| Example | T¹ | T² | R | Z |
| --- | --- | --- | --- | --- |
| 2 | hydrogen | hydrogen | ethyl | hydrogen |
| 3 | hydrogen | hydrogen | methyl | hydrogen |
| 4 | hydrogen | hydrogen | methyl | methyl |
| 5 | hydrogen | chlorine | methyl | mehtyl |
| 6 | hydrogen | nitro | methyl | methyl |
| 7 | mehtyl | hydrogen | methyl | methyl |
| 8 | methoxy | hydrogen | methyl | methyl |
| 9 | bromine | hydrogen | methyl | mehtyl |

The dyestuffs of Examples 2 to 9 were obtained by condensing malonodinitrile with the appropriate aldehyde of the formula:

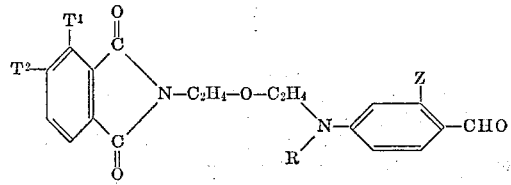

by methods similar to that described in Example 1. The above aldehydes were themselves obtained by condensing the appropriate potassium phthalimide of the formula:

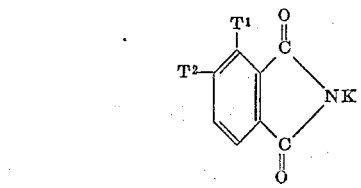

with a compound of the formula:

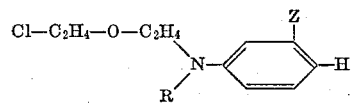

and treating the resulting compounds with phosphorous oxychloride in dimethylformamide.

What I claim is:
1. A water-insoluble styryl dyestuff of the formula:

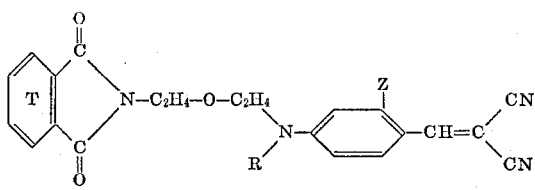

wherein
R represents a lower alkyl radical;
Z is selected from the class consisting of hydrogen and lower alkyl;
and the benzene ring T can contain a substituent selected from the class consisting of lower alkyl, lower alkoxy, chlorine, bromine and nitro.

References Cited

UNITED STATES PATENTS 3,349,098   10/1967   Straley et al. _____ 260—326

ALEX MAZEL, Primary Examiner

J. A. NARCAVAGE, Assistant Examiner

U.S. Cl. X.R.
8—57; 260—37, 40